United States Patent [19]

Belyakov et al.

[11] Patent Number: 5,932,361
[45] Date of Patent: Aug. 3, 1999

[54] CERAMIC BASED MEMBRANES

[76] Inventors: Vladimir Nikolaevich Belyakov, Prospect Maiakovskogo, 21-B Appartment 83, Kiev-225 253225, Ukraine; Vladimir Mikhailovich Linkov, 74 Oldenland Street, Somerset West 7130, South Africa

[21] Appl. No.: 08/953,231

[22] Filed: Oct. 17, 1997

[30] Foreign Application Priority Data

Oct. 21, 1996 [ZA] South Africa .......................... 96/8811

[51] Int. Cl.$^6$ .............................. B32B 9/00; C01B 33/36; C01B 39/00; B01J 20/28
[52] U.S. Cl. ...................... 428/688; 423/449.3; 423/460; 423/700; 423/714; 427/214; 427/215; 427/376.2; 427/397.7; 427/419.3; 502/4; 502/100; 428/404; 428/406; 428/408; 428/410; 501/5; 501/53; 501/63; 501/94; 501/133
[58] Field of Search ..................... 427/244, 115, 427/341, 214, 215, 397.7, 419.3, 376.2; 502/4, 100; 423/700, 714, 460, 449.3; 501/5, 53, 63, 94, 133; 428/688, 404, 406, 408, 410

[56] References Cited

U.S. PATENT DOCUMENTS

| | | | |
|---|---|---|---|
| 3,926,669 | 12/1975 | Auborn ................................ | 136/6 LN |
| 4,119,503 | 10/1978 | Spaziante et al. .................... | 204/59 R |
| 4,265,745 | 5/1981 | Kawaguchi et al. .................... | 210/654 |
| 4,376,104 | 3/1983 | Ball et al. ................................ | 423/707 |
| 4,465,780 | 8/1984 | Pine ........................................ | 502/68 |
| 4,610,866 | 9/1986 | Debsikdar et al. .................... | 423/600 |
| 4,673,767 | 6/1987 | Nimry et al. ............................ | 585/467 |
| 4,710,278 | 12/1987 | Polak et al. ............................. | 204/129 |
| 4,738,874 | 4/1988 | Berardo et al. ........................ | 427/244 |

(List continued on next page.)

FOREIGN PATENT DOCUMENTS

WO90/09231 8/1990 WIPO .

OTHER PUBLICATIONS

Permeability and diffusivity of hydrogen through PD–Y–In(Sn, Pb) alloy membranes; Y. Sakamoto, F.L. Chen and Y. Kinari; Journal of Alloys and Compounds, 205 (1994) pp. 205–210. (No month).

Membrane–based gas separation; W.J. Koros and G.K. Fleming; Journal of Membrane Science, 83 (1993) pp. 1–80. (No month).

Gas Separations with Inorganic Membranes; Ramesh R. Bhave, Ph.D. Inorganic Membranes Synthesis, Characteristics and Applications; pp. 155–176. (No month).

Gas Transport and separation with ceramic membranes. Part I. Multilayer diffusion and capillary condesation; R.J.R. Uhlhorn, K. Keizer and A.J. Burggraaf; Journal of Membrane Science, 66 (1992) pp. 259–269. (No month).

(List continued on next page.)

*Primary Examiner*—Diana Dudash
*Attorney, Agent, or Firm*—Larson & Taylor

[57] ABSTRACT

A method of preparing a membrane is disclosed, which includes the step of impregnating an inorganic proton-conductive material into matrices of porous ceramic membranes. The inorganic proton-conductive material may include an inorganic poly-acid, such as polyphosphates or poly-antimonic acids. The inorganic proton conducting material may include Zr (zirconium).

The invention further provides a porous ceramic membrane, which includes an inorganic proton-conductive material impregnated into a porous ceramic membrane matrix.

The ceramic membrane may be a tubular ceramic membrane, which includes pores with a diameter of at least 0.3 μm, and depositions of electroconductive coatings onto its surface on which externally applied potential can be applied as a driving force for hydrogen separation.

10 Claims, 3 Drawing Sheets

Relationship between permeability of hydrogen (■,□) and helium (○,●) through ceramic based membranes and number of consecutive impregnations of zirconium phosphate (N). Membrane with electroconductive coatings (solid symbols) and without electroconductive coatings (open symbols).

U.S. PATENT DOCUMENTS

| | | | |
|---|---|---|---|
| 4,784,880 | 11/1988 | Coplan et al. | 427/245 |
| 4,797,187 | 1/1989 | Davis et al. | 427/245 |
| 4,888,033 | 12/1989 | Charpin et al. | 427/244 |
| 4,897,370 | 1/1990 | Horiguchi et al. | 501/5 |
| 4,929,406 | 5/1990 | Abe et al. | 427/244 |
| 4,957,890 | 9/1990 | Wieserman et al. | 427/244 |
| 4,962,073 | 10/1990 | Martin et al. | 427/244 |
| 4,968,426 | 11/1990 | Hay | 427/244 |
| 5,093,286 | 3/1992 | Nogami et al. | 501/17 |

OTHER PUBLICATIONS

Permeability and diffusivity of hydrogen in palladium–rich PD–Y (Gd)–Ag ternary alloys; Y. Sakamoto, F.L. Chen, M. Furukawa and M. Noguchi; Journal of Alloys and Compounds, 185 (1992) pp. 191–205. (no month).

Ceramic zeolite composite membranes. Preparation, characterization and gas permeation; Meng–Dong Jia, Klaus–Viktor Peinemann and Rolf–Dieter Behling; Journal of Membrane Science, 82 (1993) pp. 15–26. (No month).

Studies on Solid Electrolyte Gas Cells with High–Temperature–Type Proton Conductor and Oxide Ion Conductor; H. Iwahara, H. Uchida and N. Maeda; Solid State Ionics, 11 (1983) pp. 109–115.

Proton Transport in the ββ—Aluminas; K.G. Frase and G.C. Farrington; Ann. Rev. Mater. Sci. 1984, pp. 279–295.

Crystalline Hydrous Zirconia; A. Clearfield; Received May 25, 1963; Inorganic Chemistry Notes, pp. 146–148.

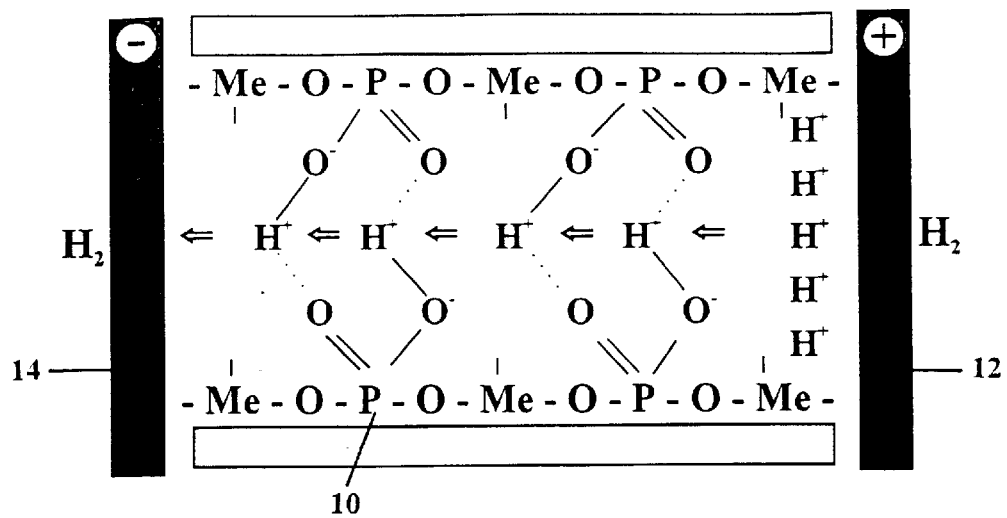
Figure 1. Hydrogen separation by proton conductivity in polyphosphates.
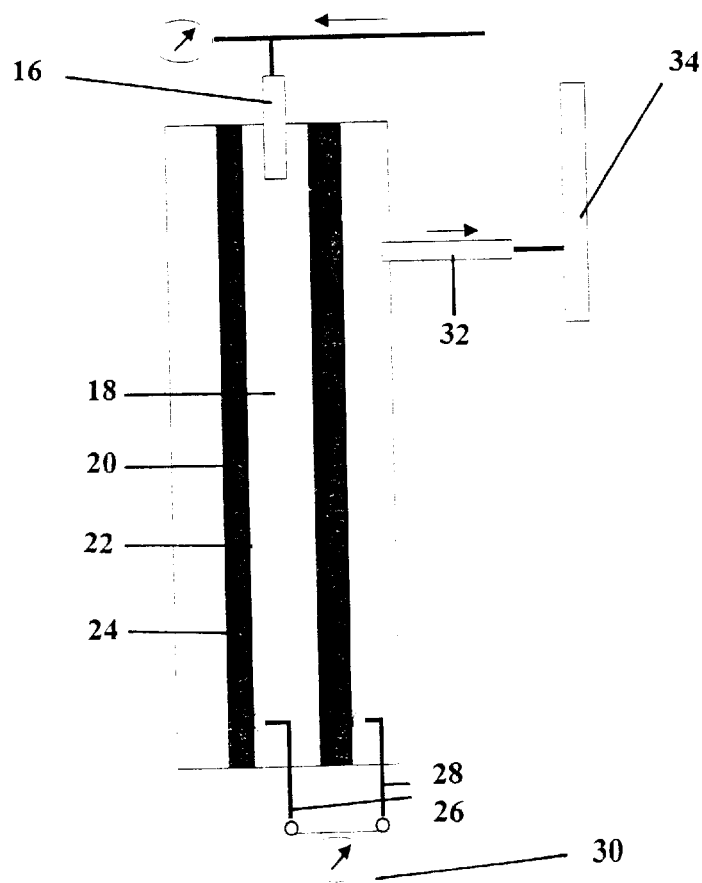
Figure 2. Installation for gas permeability experiments.

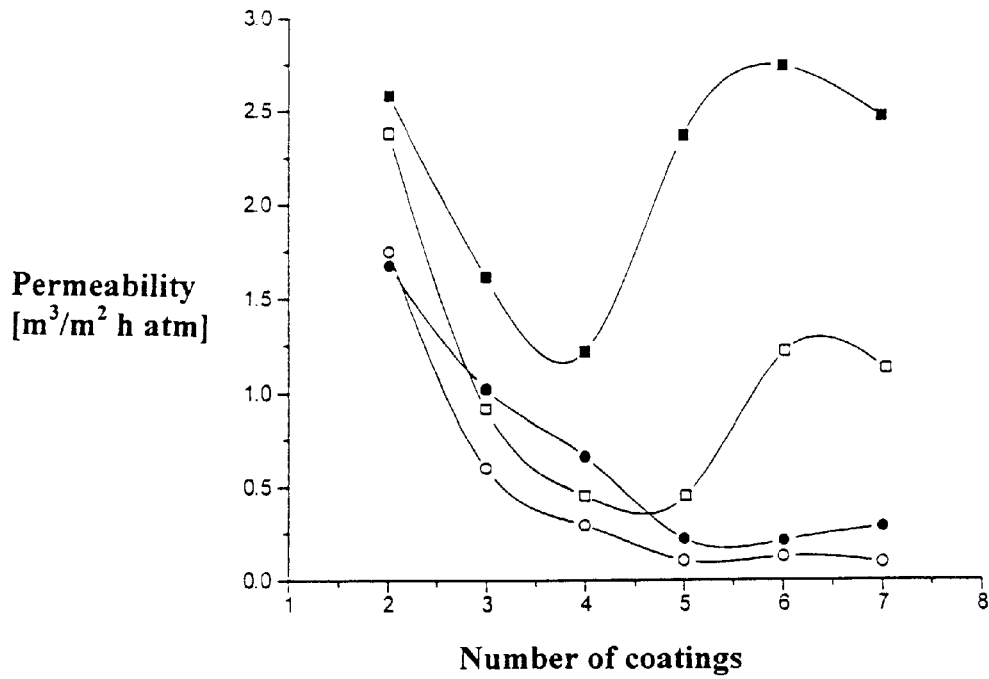

Figure 3. Relationship between permeability of hydrogen (■,□) and helium (○,●) through ceramic based membranes and number of consecutive impregnations of zirconium phosphate (N). Membrane with electroconductive coatings (solid symbols) and without electroconductive coatings (open symbols).

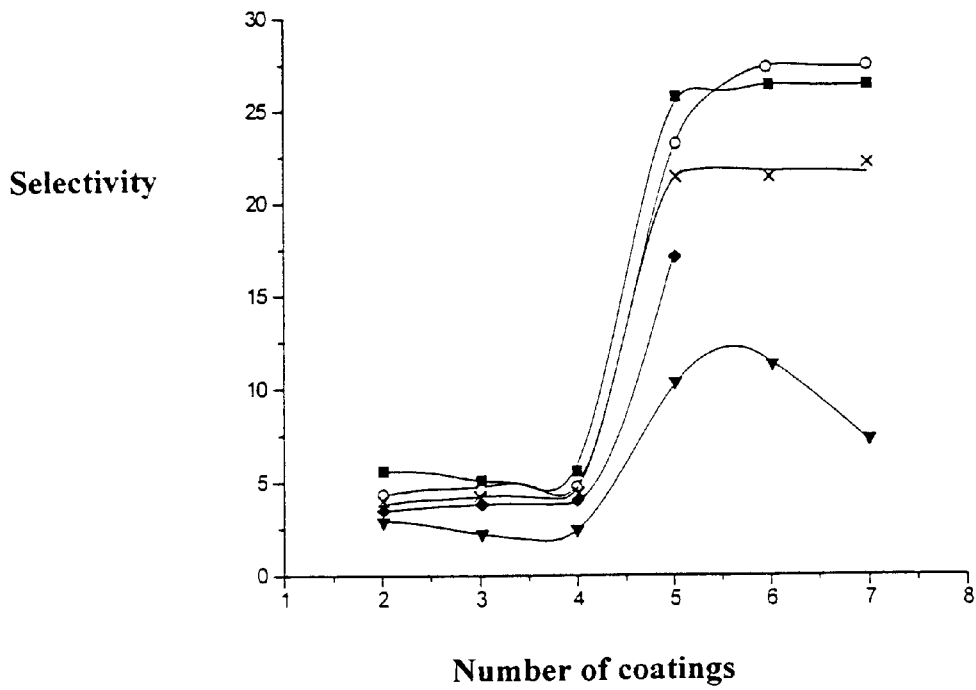

Figure 4. Relationship between hydrogen selectivity for gas pairs $H_2$ / Ar (■), $H_2$ / $N_2$ (○), $H_2$ / He (▼), $H_2$ / $CH_4$ (×) and $H_2$ / $C_3H_8$ (♦) and number of consecutive impregnations of zirconium phosphate (N) for membrane with electroconductive coatings..

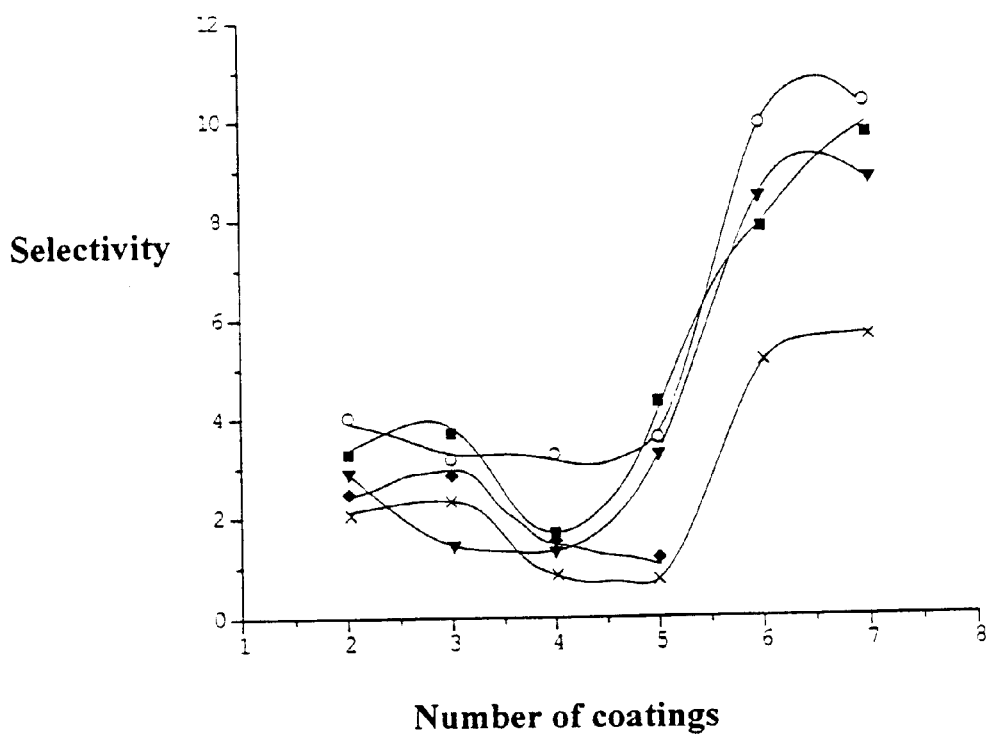
Figure 5. Relationship between hydrogen selectivity for gas pairs $H_2$ / Ar (■), $H_2$ / $N_2$ (○), $H_2$ / He (▼), $H_2$ / $CH_4$ (✕) and $H_2$ / $C_3H_8$ (◆) and number of consecutive impregnations of zirconium phosphate (N) for membrane without electroconductive coatings.

CERAMIC BASED MEMBRANES

FIELD OF INVENTION

The present invention relates to ceramic membranes.

More particularly, the invention relates to ceramic membranes, which can be used for gas separation, e.g. separation of hydrogen.

BACKGROUND TO INVENTION

Hydrogen is one of the most important raw materials in the chemical industry. It is expected that in the foreseeable future hydrogen consumption will increase drastically due to its use as an ecologically clean fuel.

Among existing hydrogen generation methods the purest gas is obtained by means of water electrolysis. This process is not widely used in industry due to high energy requirements. Less costly hydrogen generation methods are based on natural gas or oil conversion by steam or carbon monoxide. The most serious disadvantage of such methods is low hydrogen purity due to the presence of CO, $CO_2$, $CH_4$ and $H_2O$. Large quantities of hydrogen are also formed during hydrocracking and catalytic reforming of oil fractions. The impurities present in these cases are mainly the products of such processes.

The development of an effective hydrogen separation and purification method is therefore of critical importance. As a rule, existing hydrogen purification processes include several stages based on methods such as absorption, adsorption, rectification of liquidized gas and fractionation condensation. Many stage processes drastically increase the cost of hydrogen.

Membrane separation is regarded nowadays as a most preferred method for production of purified hydrogen and, according to comparative evaluation presented in U.S. Pat. No. 4,265,745 is increasingly cost effective. The availability of membrane materials, which are either selectively permeable for hydrogen, or, alternatively allow for penetration of various gases other than hydrogen, makes it possible to develop a one-stage hydrogen purification process.

Some of the best known hydrogen separation membranes, which have also found some limited industrial applications, are thin Pd or Pd-alloy films. The separation process in this case is based on the ability of hydrogen to dissolve in palladium and diffuse through it. The fact that no other gasses are soluble in palladium manifests itself in extremely high selectivity (>1000), which is suitable for one stage hydrogen purification. The drawback of palladium membranes results from the mechanism of hydrogen permeation through them. It is based on the diffusion through a non-porous solid material, where the diffusion rate is determined by the equation:

$$D=k P^a, 0.5<a<1.0$$

where k is a constant and P is pressure.

Under those conditions any considerable hydrogen permeability can be obtained at high pressures only. Due to low values of the diffusion constant the maximum permeability is limited to about 2000 barrers. Another serious disadvantage of palladium membranes is their extremely high cost. Various palladium alloy membranes with higher diffusion constant and lower cost have been introduced in recent years. [Y. Sakamoto, F. L. Chen, M. Furukawa, N. Noguchi, J. Alloy and Comp., 185 (1992) 191.; Y. Sakamoto, F. L. Chen, Y. Kinari, J. Alloy and Comp., 205 (1994) 205].

Other successful hydrogen separation membranes are based on polymeric materials [W. J. Koros, G. K. Fleming, J. Membr.Sci., 83 (1993) 1.], porous ceramics [Inorganic membranes, R. R. Bhave ed., Van Nostrand Reinolds, N.Y., 1991, p.155] and [R. J. R. Uhlhorn, K.Keiser, A. J. Burgraff, J. Membr. Sci., 66 (1992) 259.], zeolite molecular sieves [PCT Patent WO 90/092231] and [Meng-Dong Jia, K. V. Reinemann, R. D. Behling, J. Membrane Sci., 82 (1993) 15.] and molecular sieving carbons [W. J. Koros, G. K. Fleming, J. Membr.Sci., 83 (1993) 1.].

A different and very promising class of hydrogen separation membranes is based upon the use of proton-conductors. At present two main types of proton conductors are known. The first type includes comparatively wide spectrum of materials of oxide and sulfide nature [H. Iwakawa, H. Uchida, N. Naeda, Solid State Ionics, 11 (1992) 109.] and [K. G. Frase, G. C. Farrington, J. O. Thomas, Ann. Rev. Mater Sci., 14 (1984) 279.]. As a rule such materials do not contain protons and are capable of proton inclusion and transport due to existence of cation exchange sites in their structures [F. M. Ingberger, J. Non-Crystal. Solids, (1980) 39.]. The formation of such sites and therefore any considerable proton conductivity in such materials occurs at elevated temperatures only.

Low temperature proton transport occurs in the proton conductors of a second type. It comprises most of solid inorganic poly-acids, i.e. proton containing compounds. The proton conductive properties of such materials have been studied in great detail. It has been established that only poly-antimonic acids and acidic phosphates of polyvalent metals exhibit proton transport of considerable value. In poly-antimonic acids protons are located in the channels of the crystalline structure. Inacidic polyphosphates of zirconium and titanium protons, which are a part of phosphates groups, form layers between metal atoms. In both cases the concentration of protons in specific directions and comparatively low distances between protons result.

It is an object of the invention to suggest a novel ceramic based membrane for use in hydrogen separation.

SUMMARY OF INVENTION

According to the invention, a method of preparing a membrane includes the step of impregnating an inorganic proton-conductive material into matrices of porous ceramic membranes.

The inorganic proton-conductive material may include an inorganic poly-acid.

The poly-acid may include polyphosphates.

The poly-acid may include poly-antimonic acids.

The inorganic proton conducting material may include Zr (zirconium).

Further according to the invention, a method of preparing a membrane includes the following steps:
  introducing a polyvalent metal salt into a porous ceramic membrane matrix, and
  treating the ceramic membrane matrix with a poly-acid.

The polyvalent metal salt may include Zr (zirconium).

Also according to the invention, a method of preparing a membrane includes the following steps:
  introducing a polyvalent metal oxide sol into a porous ceramic membrane matrix, and
  treating the ceramic membrane matrix with a poly-acid.

Yet further according to the invention, a porous ceramic membrane includes an inorganic proton-conductive material impregnated into a porous ceramic membrane matrix.

The ceramic membrane may be a tubular ceramic membrane.

The ceramic membrane may include pores with a diameter of at least 0.3 μm.

The ceramic membrane may include depositions of electroconductive coatings onto its surface on which an externally applied potential can be applied as a driving force for hydrogen separation.

The ceramic membrane may include depositions of electroconductive coatings onto its surface that increase hydrogen permeability and selectivity by catalysing proton formation from hydrogen molecules.

The ceramic membrane may include depositions of electroconductive coatings onto its surface that increase hydrogen permeability and selectivity by enhancing a hydrogen electrochemical cell formation and by levelling its surface electrochemical potential.

The ceramic membrane may be used for gas separation; and in particular separation of $H_2$ from a mixture of gases. It also can be used as a sensor for hydrogen activity in a gas.

BRIEF DESCRIPTION OF DRAWINGS

The invention will now be described and further explained by way of example with reference to the accompanying schematic drawings and diagrams.

In the drawings there is shown in:

FIG. 1 Hydrogen separation by proton conductivity in polyphosphates;

FIG. 2 an installation for gas permeability experiments;

FIG. 3 the relationship between permeability of hydrogen and helium;

FIG. 4 the relationship between hydrogen selectivity for gas pairs; and

FIG. 5 the relationship between hydrogen selectivity for gas pairs.

DETAILED DESCRIPTION OF DRAWINGS

FIG. 1 shows schematically hydrogen separation taking place by proton conductivity in polyphosphates. Here a proton containing compound 10 is placed between the two electrodes, namely an anode 12 and a cathode 14, and a potentional drop is applied. Thereupon movement of protons from the anode 12 to the cathode 14 will occur.

If hydrogen molecules are present at the anode side of the material, their oxidation to protons will take place, these newly formed protons will enter the material and, after traveling to the cathode according to the "relay race" mechanism will be reduced back to hydrogen molecules. This process results in hydrogen separation from the rest of the species present at the anode side.

The described mechanism allows for development of selective membrane materials for low temperature hydrogen separation by means of poly-antimonic acid or acidic polyphosphate membranes. The membrane selectivity in this case will be determined by the possibility of oxidation of any particular gas to a cation form. No patents or publications dealing with the application of such materials as gas separation membranes have been found. The closest example is presented in [Euro Patent 0470822 A1] where the method is described for preparation of proton conductive membrane materials form certain oxides and sulfides of polyvalent metals.

Only high temperature (>500° C.) proton conductivity and as a result, hydrogen separation, has been observed.

Low temperature proton conducting membrane materials were used as hydrogen sensors [H. Iwakawa, H. Uchida, N. Naeda, Solid State Ionics, 11]

One of the possible reasons for unavailability of polyphosphate or poly-antimonic acid membranes for hydrogen separation is that previously these materials were processed only in disperse form. Self supporting membranes can be formed from disperse materials by the agglomeration methods only and therefore would posses low mechanical strength and high electrical resistance at contact sites. The formation of materials with better mechanical properties would require higher firing temperatures (>1000° C.) resulting in loss of the proton conducting structure.

FIG. 2 shows an installation for gas permeability experiments.

Gas is supplied via a gas inlet 16 to the space 18 in a ceramic tubular membrane 20 in accordance with the invention. The inside surface 22 of the membrane 20 forms the anode and the outside surface 24 the cathode. A voltage is applied by way of the leads 26, 28 to the anode 22 and cathode 24 respectively. The electrical potential is controlled by way of a potentiometer and voltmeter 30. The yield flows via the outlet 32 to a volumetric equipment 34.

FIG. 3 shows the relationship between the permeability of hydrogen and helium through ceramic based membranes in accordance with the invention. The membranes have been impregnated with zirconium phosphate.

The membranes without electroconductive coatings are indicated by the symbol □ or ○, and the membranes with electroconductive coatings by the symbol ■ or ●.

FIG. 4 shows the relationship between hydrogen selectivity for gas pairs $H_2/Ar$(■), $H_2/N_2$(○), $H_2/He$ (▼), $H_2/CH_4$(X) and $H_2/C_3H_8$(♦).

The membranes have been coated by a number of electroconductive coatings.

FIG. 5 shows the relationship between hydrogen selectivity for gas pairs $H_2/Ar$(■), $H_2/N_2$(○), $H_2/He$(▼), $H_2/CH_4$ (X) and $H_2/C_3H_8$(♦).

Membrane Preparation

According to the invention, in order to improve mechanical properties of zirconium polyphosphates and enable precise control over the pore structures of resulting membranes these materials were impregnated into matrices of porous ceramic membranes. The membranes were used as supports in the impregnation operation. The porous structure of such membranes allowed for impregnation of significantly large quantities of polyphosphate while the shape and mechanical properties of initial ceramic membranes remained unchanged.

1. Impregnation of Zirconium Polyphosphate into the Porous Structure of Ceramic Membranes The most widely used method for zirconium phosphate preparation is based on the reaction of aqueous solutions of zirconium salts with phosphoric acid or its salts. The products of such reactions have an amorphous structure and a high water content. The drying of such compounds at temperatures up to 200° C. results in removal of water and densification of the structure of the material, which is accompanied by considerable decrease in the polyphosphate particle volume (1–5 fold depending on the drying conditions). Significant decrease in the volume of polyphosphate particles is an undesirable process as far as its impregnation into the ceramic membrane porous structure is concerned. It results in the micro-crack formation leading to destructurization of interparticle contact areas and finally to a decrease in proton conductivity.

It was therefore decided to use an alternative method of zirconium phosphate impregnation during the preparation of proton conducting hydrogen separation membranes. The methods are known for preparation of crystallized sols of zirconia [A. Clearfield, J. Inorg. Chem., 3 (1964) 146], which retain their particle sizes after drying, because the crystalline structure of the sol particles does not allow for densification. It is known that the treatment of disperse zirconia with phosphoric acid results in the formation of zirconium phosphate. The transformation leads to an increase in the volume occupied by zirconium phosphate particles in comparison with that of initial zirconia. This volume increase is attributed to introduction of a large number of phosphate groups during the cleavage of oxide bonds according to the reaction:

$$\equiv Zr-O-Zr\equiv + 2H_3PO_4 \rightarrow \equiv Zr-PO_4H_2 + H_2PO_4-Zr\equiv$$

As a result, the phosphate generated in the membrane matrix should compress inside the pores and fill them densely. In this way good contact between phosphate particles will occur.

Based on the above considerations the following method has been developed for the preparation of ion conductive membranes by means of introduction of zirconium phosphate into the porous structure of ceramic membranes.

Tubular ceramic membranes were immersed in 1M zirconia sol for 12 h. The sol was prepared by neutralization of 1 M solution of $ZrOCl_2$ by 25% ammonia solution at 80° C. followed by refluxing for 27 h. After removal from the sol the membrane surfaces were wiped with filter paper and the membranes were immersed in 15% solution of phosphoric acid for 15 h. After the phosphoric acid treatment the membranes were thoroughly washed with distilled water, air-dried for 24 h at room temperature and then at 200° C. for 2–3 h.

In order to obtain better filling of the membrane porous structure with zirconium phosphate the described above impregnation procedure was repeated up to 5 times.

2. Deposition of Electroconductive Coatings onto the Surface of Proton-Conductive Membranes The proton conductivity based on the hydrogen separation process required as a driving force a drop in electrical potential between the membrane surfaces. The potential drop can occur internally if the electrochemical cell is formed in the membrane structure or can be applied externally by means of electrical leads connected to the membrane surfaces. In order to enhance the electrochemical cell formation and/or to enable the application of potential drop generated by an external power source, electroconductive metal coatings were deposited onto the membrane surfaces.

Due to the fact that the electrical conductivity of initial ceramic membranes is very low, it was decided to use an electroless method for plating of metal coatings (electrodes) on both inside and outside membrane surfaces.

Nickel was used as a plating metal due to its high anti-corrosion stability and low cost in comparison with platinum group metals and silver which are more widely used as electrode coatings.

In electroless plated coatings nickel is present mostly as an alloy with phosphorus or boron. Such coatings are prepared by reduction of nickel ions from solutions containing sodium hypophosphite or boron compounds. Taking into account that zirconium phosphate was responsible for ion conductive properties of the newly developed membranes it was decided to use sodium hypophosphite as a reducing agent.

It is known that spontaneous reduction of nickel ions takes place in the presence of iron group metals, aluminium and palladium. It was necessary to activate the membrane surfaces prior to the nickel deposition by introducing one of these metals. It was decided to use palladium for the activation due to its ability to act as a catalyst in the hydrogen disproportionation reaction:

$$H_2 \rightarrow 2H,$$

which is important for proton formation during hydrogen separation by proton conductive membranes.

The nickel electroless plating method that allowed for the formation of coatings with high porosity and good adhesion to ceramic surfaces was chosen.

Before the nickel deposition operation the membranes were treated in the aqueous solution of the following composition:

$Na_3PO_4$ 20 g/l $Na_2CO_3$ 20 g/l

The treatment was carried out at 60° C. for 10 min; it was followed by washing in distilled water for 10 min.

The first stage of the deposition operation was the introduction of palladium which was done by immersing the membranes in the following aqueous solution:

$PdCl_2$ 0.5 g/l

HCl 5 ml/l.

The solution temperature was 35–40° C., the duration of the treatment was 5 min with consecutive washing in distilled water for 1–2 min.

Nickel deposition was realized using the electroless plating bath of the following composition:

| | |
|---|---|
| $NiSO_4 \times 7H_2O$ | 30 g/l |
| $NaH_2PO_2 \times H_2O$ | 10 g/l |
| $NaCH_3COO$ | 10 g/l |
| $Na_3C_6O_7H_5 \times 2H_2O$ | 10 g/l |
| Amino-acetic acid | 10 g/l |
| pH of solution | 5,0–5,2 |
| Temperature | 90° C. |

The nickel deposition rate was 20 μm/h. The required thickness of the nickel layer was 10 μm, the plating time therefore was 30 min.

After the nickel deposition operation the membranes were washed in distilled water for 1 min. The chemical composition of the coating was as follows:

Ni—94%

P—6%

Taking into account that the nickel plating bath contained large quantity of cations and that zirconium phosphate present inside the ceramic membrane matrix was a material with strong cation exchange properties, it was expected that proton-conducting characteristics of the membranes would be hindered by the plating operation. In order to avoid that it was necessary to remove adsorbed cations from the membranes.

Because the treatment with concentrated acids (1–2 M $HNO_3$ and $H_2SO_4$) widely used for regeneration of cation exchange materials would lead to deterioration of the nickel coating, an alternative cation removal method was used in this work. The membranes were treated with a 25% ammonia solution for 24 h resulting in substitution of cations by ammonia ions:

≡P—O⁻ᶜᵃᵗ⁺+NH⁺→≡P—O⁻NH4⁺+Cat⁺.

This was followed by the heat treatment at 200° C. for 2 h, resulting in the formation of acidic polyphosphate:

≡P—O⁻NH₄⁺→≡P—O⁻H⁺+NH₃

Gas Permeability Experiments

The schematic layout of the installation used for gas permeability experiments is shown in FIG. 2. Feed gases were introduced via inlet 16 into the inner lumen 18 of tubular ceramic based membranes 20 which were 105 mm long. Atmospheric pressure was maintained at the other side of the membranes. Volumetric equipment 34 was used to measure permeability of pure gasses. Current leads 26, 28 were connected to inside and outside membrane surfaces 22, 24. The electric potential drop across the membrane wall was measured by a millivoltmeter, external potential was applied by means of a potentiostate 30.

The following pure gases were used in the permeability experiments: hydrogen, helium, argon, nitrogen, methane and propane.

1. Initial Experiments

The proton conductive membranes for initial gas permeability experiments were produced by the impregnation of zirconium phosphate into the porous structure of tubular ceramic membranes and the deposition of electroconductive coatings onto their surfaces. The ceramic membranes used as supports had pore diameters of 0.2 μm and porosity of 40%.

Hydrogen permeability through the membranes without externally applied potential drop was directly proportional to the number of consecutive zirconium phosphate impregnation operations as illustrated in Table 1.

TABLE 1

Hydrogen permeability through ceramic based membranes in relation to number of zirconium phosphate impregnation operations

| Number of impregnations | Permeability, $m^3/m^2$ h atm |
|---|---|
| 2 | 1.22 |
| 3 | 1.36 |
| 4 | 1.42 |
| 5 | 1.53 |

A high number of zirconium phosphate impregnation operations resulted in an increase in proton concentration inside the membrane matrix. An increase in hydrogen permeability with the number of impregnations testified to the proton conductivity mechanism of hydrogen transport through the membranes.

Although no external electric potential was applied to the membrane surfaces, a potential drop across the membrane wall in the range from 10 to 200 mV, depending on the number of impregnations and hydrogen pressure, was observed. It was also found that the hydrogen permeability maximum was reached at approximately 30 min after the start of the experiment; the permeability was constant afterwards. No such time—permeability relationship was observed for any other gases studied. With an increase in hydrogen permeability the potential drop across the membrane wall decreased and reached the constant value at approximately the same time as the constant permeability was established.

The permeability—potential drop relationship indicated above was due to the formation of a hydrogen electrochemical cell in the proton conductive membrane. The electromotive force occurring in the cell is determined by the hydrogen partial pressure at two sides of the membrane. Zirconium phosphate acts as a solid electrolyte. At the starting point of the experiment the difference in hydrogen concentrations at opposite sides of the membranes was at its maximum resulting in a maximum potential drop. The subsequent decrease in potential drop was due to a smaller difference in hydrogen concentrations at two membrane sides. The ceramic component of the membrane possesses certain electron conductivity and allows for electrons formed on the anode side of the membrane during oxidation of hydrogen to take part in its reduction on the cathode side. Thus hydrogen transport through the ceramic based membrane can take place without externally applied potential drop.

The application of external electric potential allows to control hydrogen permeability through the membranes. With an increase in external potential the permeability increased and reached a constant value at a potential drop of about 0.25 V. Apparently after this point no more protons were available for hydrogen transport inside the membrane.

2. Membranes with Improved Hydrogen Selectivity

Based on the initial permeability experiments, the following alterations to the membrane structure were effected in order to improve hydrogen transport through the ceramic based membranes:

Ceramic membranes with larger pore diameters (0.3 μm) and higher porosity (50%) were used as supports for the zirconia phosphate impregnation and the deposition of electroconductive coatings.

In the zirconium phosphate impregnation operation the immersion time of membranes in zirconia sol was increased from 12 h to 48 h.

The number of consecutive zirconium phosphate impregnation operations was increased from 5 to 7.

The nature of the pressure—permeability relationships for the modified membranes appeared to be similar to that of initial membranes.

The relationship between the permeabilities of hydrogen and helium through the modified ceramic based membranes and the number of consecutive impregnations of zirconium phosphate is illustrated in FIG. 3. For both gases the membranes with and without surface nickel coatings were tested. With more impregnation operations the $H_2$ permeability through membranes with and without nickel coating decreased initially and, after 4–5 consecutive impregnations started to increase. The limit in $H_2$ permeability occurred after 6 consecutive impregnation operations. It was also noticeable that the nickel coated membranes exhibited significantly higher $H_2$ permeability than those without metal coatings. This was due to the levelling of the surface electrochemical potential of the membranes in the presence of nickel layer and catalytic action of palladium in the reaction of hydrogen disproportionation.

In the case of He permeability a steady decrease was observed with an increase in the number of consecutive impregnations from 1 to 5. More or less constant permeability values were maintained afterwards. No pronounced difference in the performance of the membranes with and without electroconductive coatings was observed.

The comparison between $H_2$ and He permeabilities through the ceramic based membranes showed that the drop in flow rates of both gases after 4–5 consecutive impregnation operations was due to the reduction in pore sized and total porosity of the membranes. Further pore filling with zirconium phosphate resulted in higher proton conductivity and in higher $H_2$ permeability values in comparison with those for He. The presence of permeability limits on both hydrogen curves testifies to that assumption, because the number of protons that can be introduced by the impregnation of zirconium phosphate into the ceramic membrane support is limited by its pore volume.

It is clear from the data represented in Table 1 and FIG. 3 that the use of a higher porosity ceramic membrane support allowed for nearly a 1.5 fold increase in hydrogen permeability.

The proton conductivity effect conferred onto ceramic membranes by the impregnation of zirconium phosphate into their porous structure resulted in high hydrogen selectivity of the membranes. In FIGS. 4 and 5 hydrogen selectivities are given for ceramic membranes with and without electroconductive surface coatings. It can be seen from the figures that the membranes filled with zirconia phosphate to a lower degree were less hydrogen selective. In this case selectivities are only slightly higher than the theoretical Knudsen values. An increase in the number of consecutive impregnations leads to higher proton conductivity of the membranes and finally to higher hydrogen selectivities. A maximum in hydrogen selectivity was achieved after 5–6 consecutive impregnations.

The data of pure gas permeability experiments through the ceramic based membranes with improved hydrogen selectivity are summarized in Table 2.

TABLE 2

Maximum hydrogen selectivities of ceramic based membranes with and without electroconductive metal coatings

| | Selectivity | | | | |
|---|---|---|---|---|---|
| | $H_2/He$ | $H_2/Ar$ | $H_2/N_2$ | $H_2/CH_4$ | $H_2/C_3H_8$ |
| With metal coating | 12,15 | 26,39 | 27,44 | 22,85 | 16,95 |
| Without metal coating | 9,29 | 9,87 | 10,58 | 5,7 | 4,47 |
| Knudsen selectivity | 1,41 | 4,47 | 3,74 | 2,83 | 4,69 |

A comparison between hydrogen selectivities of ceramic based membranes impregnated with zirconium phosphate and various hydrogen selective membranes developed earlier is given in Table 3.

TABLE 3

Comparison of newly developed ceramic based membranes with literature results

| Membrane No | type | Gas Mixture | Temperature (K) | Selectivity | Permeability ($mol/m^2secPa$) |
|---|---|---|---|---|---|
| 1 | Glass modified with silica | $H_2/N_2(H_2)$ | 723 | 2000 | $1 \times 10^{-8}$ |
| 2 | same | $H_2/Ar(H_2)$ | 523 | 24 | $0,5 \times 10^{-8}$ |
| 3 | Alumina modified with silica | $H_2/C_3H_6(H_2)$ | 473 | 160 | $161 \times 10^{-8}$ |
| 4 | Carbon molecular sieve | $He/N_2$ (He) | 1123 | 22 | $27 \times 10^{-8}$ |
| 5 | Zeolite molecular sieve | $H_2/N_2(H_2)$ | 293 | 3 | $23 \times 10^{-8}$ |
| 6 | High temperature proton conductive | $H_2$ | 923 | — | $0,4 \times 10^{-8}$ |
| 7 | Low temperature proton conductive | $H_2/N_2(H_2)$ | 293 | 26 | $33 \times 10^{-8}$ |

Permeability is given for gases in brackets.

It is clear from Table 3 that the low temperature permeability of the newly developed ceramic based membranes is superior to that of many previously known membrane products. Although hydrogen permeability of the membrane No. 3 is higher, it does not exhibit good hydrogen selectivity towards gases with small molecular sizes.

Another serious advantage of the newly developed ceramic based membranes is that their preparation technology allows for manufacturing of large membrane quantities in the tubular form.

The selectivities of polymeric membranes for hydrogen separation lie in the region between 30 and 100, which is somewhat higher than those of the newly developed ceramic based membranes. However, the permeabilities of polymeric membranes are quite low and in many cases are below 10 barrers. The permeability of the newly developed ceramic based membranes reaches 70 000 barrers.

It also should be noted that for gas mixtures where the partial pressure of hydrogen is quite low and not all protons present in the membrane matrix take part in the hydrogen transport, the use of externally applied electric potential across the membrane wall will result in more drastic increase in hydrogen permeability than was observed in pure gas experiments.

We claim:

1. A method of preparing a membrane to obtain an inorganic proton-conductive material with densely filled pores, said method including the steps of a) impregnating a crystallized sol of an oxide of a polyvalent metal into matrices of porous ceramic membranes so as to substantially fully fill pores of the porous ceramic membranes to produce impregnated matrices, and b) thereafter treating said impregnated matrices of the porous ceramic membranes with phosphoric acid to yield an inorganic proton-conductive material.

2. A method as claimed in claim 1, in which the crystallized sol of an oxide of a polyvalent metal comprises a crystallized sol of zirconia.

3. A method as claimed in claim 2, in which the crystallized sol of zirconia contains microcristallite particles which retain their particle size after drying.

4. A method of preparing a membrane to obtain an inorganic proton-conductive material with densely filled pores, which includes the steps of a) repeatedly impregnating the crystallized sol of an oxide of a polyvalent metal into matrices of porous ceramic membranes so as to substantially fully fill pores of the porous ceramic membranes and thereby produce impregnated matrices, and b) thereafter treating said impregnated matrices of the porous ceramic membranes with phosphoric acid to yield an inorganic proton-conductive material.

5. A method as claimed in claim 4, in which the step of repeatedly impregnating is performed at least five times.

6. A method for preparing a membrane to obtain an inorganic proton-conductive material with densely filled pores, said method including the step of impregnating a crystallized sol of a poly-antimonic acid into matrices of porous ceramic membranes so as to substantially fully fill pores of the porous ceramic membranes to yield an inorganic proton-conductive material.

7. A porous ceramic membrane having an external surface which includes matrices of porous ceramic membranes impregnated with a crystallized sol of an oxide of a polyvalent metal treated with phosphoric acid to yield an inorganic proton-conductive material.

8. A ceramic membrane as claimed in claim 7, further including depositions of a catalytic coating thereon for increasing hydrogen permeability and selectivity by catalyzing proton formation from hydrogen molecules.

9. A ceramic membrane as claimed in claim 7, wherein the catalytic coating is electroconductive so as to enable an externally applied potential to be applied thereto as a driving force for hydrogen separation.

10. A ceramic membrane as claimed in claim 8, further including depositions of electroconductive coatings thereon which increase hydrogen permeability and selectivity.

* * * * *